United States Patent Office 3,649,640
Patented Mar. 14, 1972

3,649,640
α-ARYL-3-(2-IMIDAZOLIN-2-YL)-2-NAPHTHALENE-
METHANOLS
Theodore S. Sulkowski, Wayne, and Albert A. Mascitti,
Norristown, Pa., assignors to American Home Products
Corporation, New York, N.Y.
No Drawing. Filed Mar. 10, 1970, Ser. No. 18,306
Int. Cl. C07d 49/34
U.S. Cl. 260—309.6          5 Claims

ABSTRACT OF THE DISCLOSURE

α-Aryl-3-(2 - imidazolin - 2-yl)-2-naphthalenemethanols have been prepared which have anti-inflammatory activity.

DESCRIPTION OF THE INVENTION

The new and novel pharmacologically active compounds within the scope of the invention are represented by Formula I:

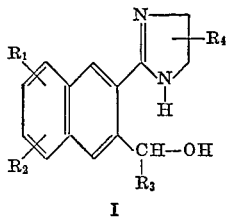

I wherein $R_1$ is selected from the group consisting of hydrogen, halogen, amino, (lower)alkylamino, (lower)alkyl and (lower)alkoxy;

$R_1$ is hydrogen, when $R_1$ and $R_2$ are dissimilar and when $R_1$ and $R_2$ are the same they are both selected from the group consisting of hydrogen, halogen(lower)alkyl and (lower)alkoxy;

$R_3$ is selected from the group consisting of phenyl, monohalophenyl, dihalophenyl, mono(lower)alkylphenyl, di(lower)alkylphenyl, trifluoromethylphenyl, mono-(lower)alkoxyphenyl, di(lower)alkoxyphenyl, thienyl, pyridyl, furyl and tetrahydro-2-naphthyl;

$R_4$ is selected from the group consisting of hydrogen (lower)alkyl and gem, di(lower alkyl); and the pharmaceutically acceptable salts thereof.

The term "(lower)alkyl" is used to describe hydrocarbon radicals, straight and branched, of from one to about six carbon atoms; illustrative members of the group being methyl, ethyl, n-propyl, i-propyl, n-butyl, n-hexyl and the like. The terms "halogen" and "halo" are used to describe the group consisting of chloro, bromo, fluoro and iodo. The term "gem" is used herein to signify that a single carbon atom is disubstituted with the particular substituents. See Hackh's Chemical Dictionary, 3rd ed., The Blakiston Company, Philadelphia, Pa. (1944), p. 373.

The compounds of the invention are prepared from the following precursors:

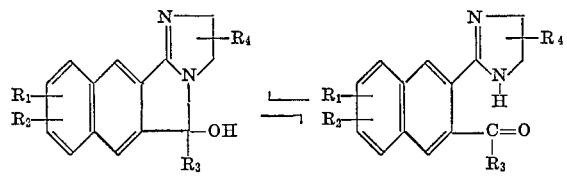

The above tautomeric compounds are described in U.S. patent application Ser. No. 18,310, filed of even date herewith by Theodore S. Sulkowski and Albert A. Mascitti. That application includes the following preparatory description:

A 3-aroyl-2-naphthoic acid and ethylene diamine or the appropriate ethylene diamine derivative are condensed by refluxing the reactants for from about 2 to about 18 hours. The condensation is preferably carried out in an inert solvent, such as toluene, xylene, benzene, pyridine etc. The reaction mixture is extracted with water and the organic portion is evaporated to dryness. Subsequently the product may be recrystallized from ethanol or ethyl acetate. This intermediate is then sulfonylated with substantially equimolar quantity of an alkyl or aryl sulfonyl halide in pyridine. The reaction is preferably conducted at reflux temperatures for a period of from about 2 to about 18 hours. After the above reaction is complete, the sulfonylated product is recovered by customary isolation procedures.

The above prepared sulfonyltetrahydrobenz[f]imidazoisoindolone may be hydrolyzed and rearranged by admixture with from about 80 to about 100 percent sulfuric acid. The product of the hydrolysis is the sulfate salt which may be recovered by conventional means.

The compounds of the invention are prepared by the following reaction scheme:

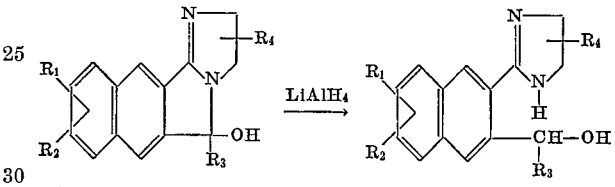

wherein $R_1$, $R_2$, $R_3$ and $R_4$ are the same as hereinabove described.

The reduction may be conducted by combining the appropiate starting material with lithium aluminum hydride in anhydrous ether. The mixture is stirred under reflux for from about 12 to about 48 hours and then decomposed by the addition of water. The product is then recovered by conventional procedures and further purified by recrystallization.

Treatment of the α-aryl-3-(2-imidazolin-2-yl)-2-naphthalenemethanols of the invention with hydrogen chloride yields the hydrochloric acid addition salt. By conventional techniques well-known to those skilled in the art, other pharmaceutically acceptable acid addition salts may be prepared. These may be prepared by treatment with acids such as hydrobromic, sulfuric, nitric, phosphoric, acetic, lactic, citric, tartaric maleic, gluconic, benzenesulfonic, toluenesulfonic, methylsulfonic, ethylsulfonic and the like.

In naming the compounds wherein $R_4$ is other than hydrogen, the $R_4$ substituent is identified as a 4(5)-(lower)alkyl or a 4,4-(5,5)-di(lower)alkyl moiety. This is in conformity with the nomenclature for imidazole type compounds set forth in Heterocyclic Compounds, R. C. Elderfield, editor, vol. 5, pp. 198, 199 and 238, John Wiley and Sons, Inc., New York (1957).

The compounds of the invention are useful anti-inflammatory agents which may be employed in comparative and experimental pharmacology as well as for other purposes. Those skilled in the art readily realize the desirability of employing control compounds which have demonstrated efficacy for inducing specific pharmacological effects when compounds of unknown activity are tested.

Activity of the compounds of the invention has been established by their ability to inhibit experimentally induced edema in the hind paw of the rat. Male Sprague-Dawley rats 120–160 grams are used. The compound is administered orally as a dispersion in distilled water (plus 2 drops of Tween 80) in a volume of 10 ml./kg. Compounds are given to 6 rats and vehicle alone is administered to 6 more rats as a control. Sixty minutes later, drug administration edema is induced by an injection of 0.05 ml.

of a 1% carrageenin solution in physiological saline into the subplantar tissue of the rat's hind paw. Paw volume is then immediately measured volumetrically with a plethysmograph and again 3 hours later. The new volume of swelling for the control group is calculated and compared to the test groups. Compounds that inhibit swelling approximately 23% in compound treated subjects are considered active. Inhibition is calculated by the formula:

Percent Inhibition $$= \frac{\text{Mean volume swelling of vehicle treated subject} - \text{Mean volume swelling of compound}}{\text{Mean volume swelling of vehicle tested subject}} \times 100$$

The compounds of the invention are active anti-inflammatory agents when administered orally to mammals at dosages of 100 milligrams per kilogram of body weight. The above test is an art recognized test for anti-inflammatory screening and evaluation. (Winter et al., Proc. Soc. Exp. Biol. and Med. 111: 544, 1962; Buttle et al., Nature 179: 629, 1957.)

DESCRIPTION OF THE PREFERRED EMBODIMENTS

The following examples describe processes of the invention. They are given for the purpose of illustrating the invention, but are not to be construed to limit it in any manner whatsoever.

EXAMPLE 1

Five grams of 5 - (p - chlorophenyl) - 2,3 - dihydro-5H-benz[f]imidazo[2,1-a]isoindol-5-ol are added in portions to a stirred mixture of 3 g. of lithium aluminum hydride and 400 ml. of anhydrous ether. The mixture is stirred and refluxed for 48 hours. The reaction mixture is then decomposed by dropwise addition of water. The ether layer is separated by filtration and the separated solids are extracted twice with ethyl acetate. The organic layers are combined and evaporated to dryness in vacuo. The residue crystallizes on standing. On recrystallization from ethyl acetate-hexane there is obtained α-(p-chlorophenyl) - 3 - (2 - imidazolin - 2 - yl) - 2 - naphthalenemethanol, M.P. 171–3° C.

Analysis.—Calcd. for $C_{20}H_{17}ClN_2O$ (percent): C, 71.32; H, 5.08; N, 8.32. Found (percent): C, 71.38; H, 4.94; N, 8.25.

EXAMPLE 2

Ten grams of 2,3-dihydro-5-phenyl-5H-benz[f]imidazo[2,1-a]isoindol-5-ol are added in portions to a stirred suspension of 5.5 g. of lithium aluminum hydride and 400 ml. of anhydrous ether. The mixture is stirred and refluxed for 24 hours. The reaction mixture is then decomposed by cautious addition of water. The ether layer is separated and evaporated to dryness in vacuo to a solid residue. On recrystallization from ethanol there is obtained 3 - (2 - imidazolin - 2 - yl) - α - phenyl - 2 - naphthalenemethanol, M.P. 155–7° C.

Analysis.—Calcd. for $C_{20}H_{18}N_2O$ (percent): C, 79.44; H, 6.00; N, 9.27. Found (percent): C, 79.21; H, 5.98; N, 9.46.

EXAMPLE 3

Three grams of 5-(3,4-dichlorophenyl)-2,3-dihydro-5H-benz[f]imidazo[2,1-a]isoindol-5-ol are added to a stirred mixture of 2 g. of lithium aluminum hydride and 500 ml. of anhydrous ether. The mixture is stirred and refluxed for 48 hours then is decomposed by dropwise addition of water. The ether layer is separated, dried over magnesium sulfate and evaporated to dryness. The residue crystallizes on standing. On recrystallization from ethanol there is obtained α-(3,4-dichlorophenyl)-3-(2-imidazolin-2-yl)-2-naphthalenemethanol, M.P. 159–161° C.

Analysis.—Calcd. for $C_{20}H_{16}Cl_2N_2O$ (percent): C, 64.70; H, 4.35; N, 7.55. Found (percent): C, 65.00; H, 4.36; N, 7.61.

EXAMPLE 4

Seven grams of 2,3-dihydro-2,2-dimethyl-5-phenyl-5H-benz[f]imidazo[2,1-a]isoindol-5-ol are added to a mixture of 4 g. of lithium aluminum hydride and 500 ml. of anhydrous ether. The mixture is stirred and refluxed for 18 hours, then is decomposed by cautious addition of water. The ether layer is separated and evaporated to dryness. The residue crystallizes on standing. On recrystallization from aqueous ethanol there is obtained 3-[4,4(5,5)-dimethyl - 2 - imidazolin - 2 - yl] - α - phenyl - 2 - naphthalenemethanol, M.P. 190–2° C.

Analysis.—Calcd. for $C_{22}H_{22}N_2O$ (percent): C, 79.97; H, 6.71; N, 8.48. Found (percent): C. 79.98; H, 6.73; N, 8.64.

EXAMPLE 5

By analogous procedures the following compounds are prepared:

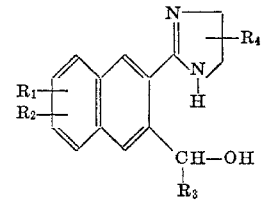

| R₁ | R₂ | R₃ | R₄ |
| --- | --- | --- | --- |
| 6-bromo | hydrogen | p-iodophenyl | methyl |
| 7-methoxy | hydrogen | 3,4-dimethylphenyl | methyl |
| 6-chloro | 7-chloro | p-methoxyphenyl | hydrogen |
| 6-methylamino | hydrogen | trifluoromethylphenyl | ethyl |
| 6-methyl | 7-methyl | 2,5-dibromophenyl | hydrogen |
| 5-ethoxy | hydrogen | 3,4-dimethoxyphenyl | methyl |
| 6-methoxy | 7-methoxy | 2-thienyl | n-butyl |
| 8-iodo | hydrogen | p-propoxyphenyl | methyl |
| 6-fluoro | 7-fluoro | 2-pyridyl | n-butyl |
| hydrogen | hydrogen | 2,5-dipropoxyphenyl | hydrogen |
| 6-ethyl | hydrogen | 2-furyl | hydrogen |
| 7-propylamino | hydrogen | 3,4-diethylphenyl | methyl |
| 6-ethyl | 7-ethyl | tetrahydro-2-naphthyl | hydrogen |
| hydrogen | hydrogen | o-chlorophenyl | methyl |
| 7-ethyl | hydrogen | phenyl | methyl |
| hydrogen | hydrogen | 2,5-dibutylphenyl | hydrogen |
| hydrogen | hydrogen | phenyl | ethyl |
| 6-ethoxy | hydrogen | p-chlorophenyl | n-propyl |
| hydrogen | hydrogen | m-chlorophenyl | hydrogen |
| 6-n-propyl | 7-n-propyl | 4-fluorophenyl | hydrogen |
| 6-amino | hydrogen | 3,4-dichlorophenyl | hydrogen |
| 6-n-butyl | hydrogen | 4-ethoxyphenyl | ethyl |
| 6-bromo | 7-bromo | 4-bromophenyl | n-propyl |
| hydrogen | hydrogen | 4-chlorophenyl | 2,2-diethyl |
| 6-chloro | hydrogen | phenyl | 2,2-di-n-propyl |

We claim:
1. A compound selected from the group consisting of

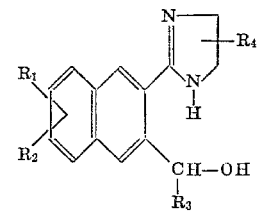

wherein R₁ is selected from the group consisting of hydrogen, halogen, amino, (lower)alkylamino, (lower)alkyl and (lower)alkoxy; R₁ is hydrogen, when R₁ and R₂ are dissimilar and when R₁ and R₂ are the same they are both selected from the group consisting of hydrogen, halogen, (lower)alkyl and (lower)alkoxy; R₃ is selected from the group consisting of phenyl, monohalophenyl, dihalophenyl, mono(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl; R₄ is selected from the group consisting of hydrogen, (lower)alkyl and gem, di(lower alkyl); and the pharmaceutically acceptable salts thereof.

2. A compound as defined in claim 1 which is α-(p-chlorophenyl) - 3-(2-imidazolin-2-yl)-2-naphthalenemethanol.

3. A compound as defined in claim 1 which is 3-(2-imidazolin-2-yl)-α-phenyl-2-naphthalenemethanol.

4. A compound as defined in claim 1 which is α-(3,4-dichlorophenyl) - 3 - (2 - imidazolin-2-yl)-2-naphthalenemethanol.

5. A compound as defined in claim 1 which is 3-[4,4 (5,5) - dimethyl - 2-imidazolin-2-yl]-α-phenyl-2-naphthalenemethanol.

References Cited

UNITED STATES PATENTS 2,744,910   5/1956   Speeter _____ 260—309.6

OTHER REFERENCES

Bachmann et al.: Chem. Abst., vol. 37, columns 5964-5 (1943).

Boehringer et al.: Chem. Abst., vol. 69, No. 106,329d (1968).

Gay et al.: J. Amer. Chem. Soc., vol. 89, pages 2297-303 (1967).

Mayer et al.: Chem. Abst., vol. 24, pages 838-9 (1930).

Mehta et al.: J. Org. Chem., vol. 27, pages 4412-8 (1962).

Metlesics et al.: J. Org. Chem., vol. 33, pages 2874-7 (1968).

Shields et al.: Chem Ind. (London), 1967(33), pages 1404-5.

NATALIE TROUSOF, Primary Examiner

U.S. Cl. X.R.

260—294.8 C, 296 B, 296 P; 424—263, 273